United States Patent [19]

Hui et al.

[11] Patent Number: 4,901,312
[45] Date of Patent: Feb. 13, 1990

[54] REMOTE INTERCONNECTION OF LOCAL AREA NETWORKS

[76] Inventors: Man H. Hui, 4 Colville Court, Kanata, Ontario, Canada, K2K 1B1; Radhakrishna S. Valiveti, 231 Pickford Dr., Kanata, Ontario, Canada, K2L 2C6; Haroon Patel, 2 Seabury Gate, Nepean, Ontario, Canada, K2J 2Z4; James A. Lamont, 6 Belgrave Road, Ottawa, Ontario, Canada, K1S 0M1; Yogesh B. Shah, 19 Fox Meadow Lane, Nepean, Ontario, Canada, K2G 3W1

[21] Appl. No.: 241,846

[22] Filed: Sep. 8, 1988

[30] Foreign Application Priority Data

May 5, 1988 [CA] Canada .................................. 565962

[51] Int. Cl.⁴ .............................................. H04J 3/26
[52] U.S. Cl. .................................................. 370/85.12
[58] Field of Search .................. 370/86, 88, 94, 85; 340/825.03

[56] References Cited

U.S. PATENT DOCUMENTS

| | | | |
|---|---|---|---|
| 4,587,651 | 5/1986 | Nelson et al. | 370/88 |
| 4,621,362 | 11/1986 | Sy . | |
| 4,706,081 | 11/1987 | Hart et al. | 370/94 |
| 4,718,060 | 1/1988 | Oguchi et al. | 370/88 |
| 4,797,881 | 1/1989 | Ben-Artzi | 370/88 |

FOREIGN PATENT DOCUMENTS 2170079 7/1986 United Kingdom .

OTHER PUBLICATIONS

"Survey of Computer Communications Loop Network: Part 1", BK Penney and AA Baghdadi, *Computer Communications*, vol. 2, No. 4, Aug. 1979, pp. 165-180.
ADAX Manual "PC-SDMA Synchronous Serial Controller For IBM SNA/SDLC, 3270, and CCITT/HDLC Data Communications", Jun. 1986.
"Report on the meeting held in Geneva from 3-14 Nov. 1986 [Part c.6.1-Recommendations Q.920 and Q.921]".
"An Architecture for Interconnecting Lan Segments", Jul. 30, 1984 by Messrs. Kian-Bon K. Sy, Daniel Avery Pitt and Robert A. Donnan.
"Gateways and Bridges for Local Area Networks" by David A. Cates.

*Primary Examiner*—Douglas W. Olms
*Assistant Examiner*—Melvin Marcelo
*Attorney, Agent, or Firm*—Cushman, Darby & Cushman

[57] ABSTRACT

A Local Area Network (LAN) is a digital communications network interconnecting serial local computer workstations. The invention provides a technique for interconnecting two or more remote LAN's. In a specific embodiment the LAN's are IBM Token Rings in which case the notion of a virtual or pseudo ring is conceived to represent the network between the remote Token Rings. Each Token Ring is connected to the network by a respective half-bridge. Each half-bridge enters a number representing the pseudo ring in the Routing Information field of the frames it forwards over the network to a remote half-bridge. The frames are preferably multiplexed by encapsulating them in a LAPD-compatible frame having a header containing an identifier which identifies the half-bridge for which the frame is destined.

7 Claims, 12 Drawing Sheets

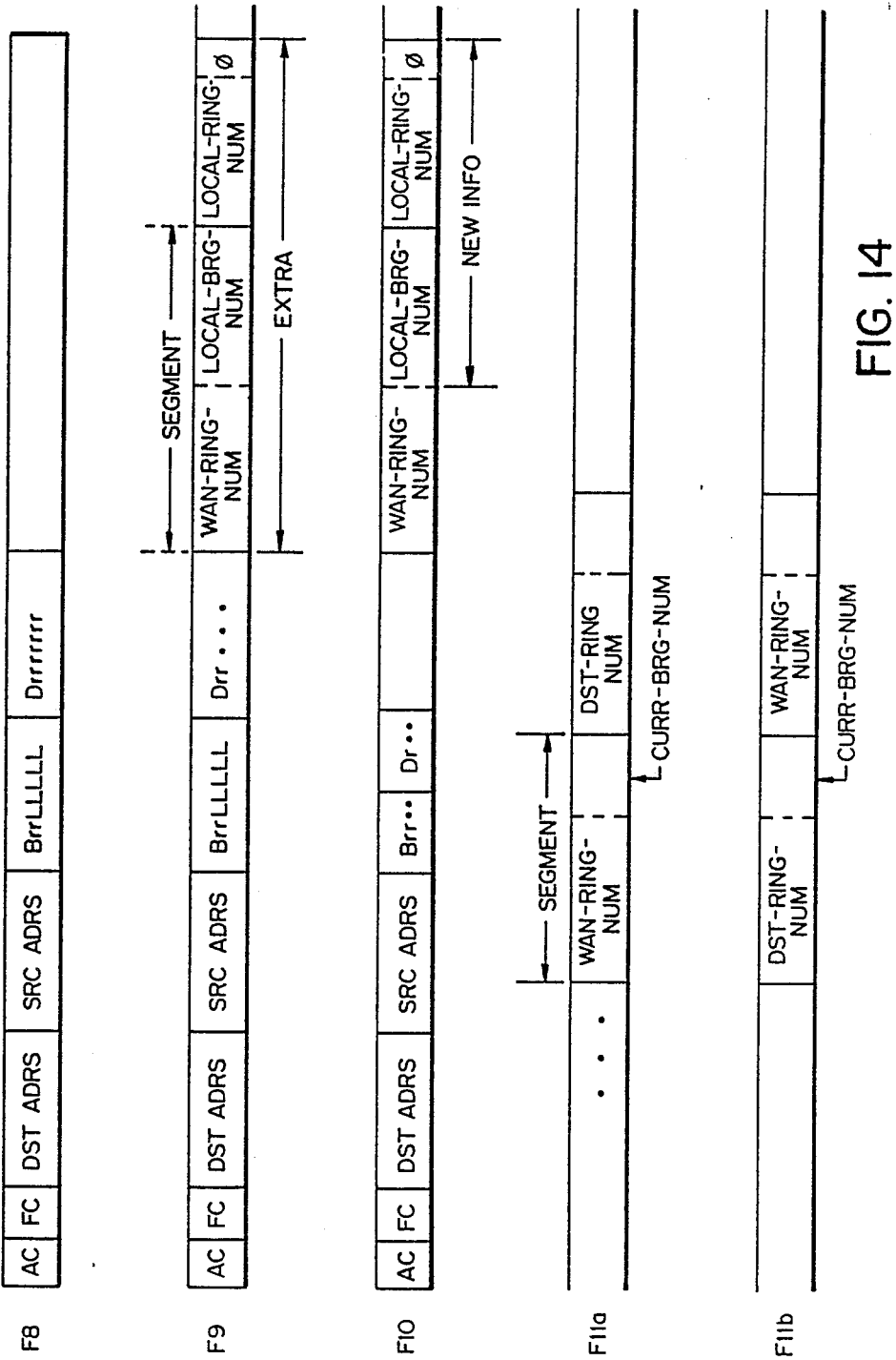

REMOTE INTERCONNECTION OF LOCAL AREA NETWORKS

BACKGROUND OF THE INVENTION

This invention relates to communication between Local Area Networks (LANs) and, particularly but not exclusively, between Token Rings (TRs) which are a particular type of LAN.

A LAN is a digital communications network interconnecting several local computer workstations. Different types of LANs have been proposed including a serial loop configuration in which several adapters are arranged serially about the periphery of the loop with respective data sources connected to the adapters. In this configuration data flows from a data source through its associated source adapter and serially through one or more intervening adapters until it reaches the target adapter where it is extracted and forwarded to the target data source. Such a serial loop LAN is the Token Ring LAN developed by IBM.

As described in U.S. Pat. No. 4,621,362 of Nov. 4, 1986 and IBM Token Ring Network: Architecture Reference, First Edition February 1986, Publication #6165877, both of which are incorporated herein by reference such Token Ring LANs can be connected with one another using full bridges to form a multiple Token Ring LAN. However, interconnection by full bridges requires that the Token Rings be located physically proximate one another.

United Kingdom published patent Application No. 2,170,079, published July 23, 1986, incorporated herein by reference, describes in general terms a procedure for interconnecting remote LANs across broadcast simplex channels which uses half-bridges which encapsulate the lowest layer frames of the LAN in data-link-layer frames. However, the half-bridges described in that published application do not implement what is termed SOURCE ROUTING, i.e, each bridge through which a frame is routed identifies itself and the associated ring. Moreover, the half-bridges assume all routing between half-bridges is done by the half-bridges themselves and cannot operate in a hubbed configuration in which the hub is some generalized switching mechanism possibly taking the form of a Wide Area Network.

SUMMARY OF THE INVENTION

It is an object of the invention to derive a procedure whereby remote IBM Token Ring LANs can be interconnected by half-bridges using Source Routing.

This object is achieved by conceiving the notion of a virtual or pseudo ring. To represent the network between the half-bridges, a half-bridge enters a number representing this pseudo ring in the Routing Information field of the frames it forwards over the network to a remote half-bridge.

The communication network for interconnecting the remote LANs, whether they be Token Rings or not, is referred generally hereinafter as a WAN (Wide Area Network). A specific form of a WAN is a network containing some switching mechanism, to which the half-bridges are each interconnected by a single physical connection. Another form of a WAN is a simple point-to-point link for interconnection of only two remote LANs.

As the detailed nature of the WAN is not germane to the invention a detailed description thereof will not be given. However, a summary of the essential aspects of a WAN is given below for ease of understanding the invention.

The term "WAN" is used in this application to refer to the means for obtaining connectivity between the half-bridges, in the following senses. First, the WAN must provide a physical bi-directional channel to each half-bridge. The details of this channel and its interfaces can vary, as described elsewhere in this application with reference to the Adapter card used to interface to the WAN.

The half-bridges place in this channel the link level frames described elsewhere in this application.

Second, the WAN may provide link-level bi-directional channels, commonly referred to as "logical links", between the half-bridges. These link-level channels are assumed to be nonduplicating and order-preserving, with possibly a small loss rate. Such a WAN provides in essence a mechanism for receiving link level frames from a physical channel attached to a half-bridge, switching these frames on the basis of their Data Link Connection Identifiers (DLCIs), and placing the switched frames on the physical channel attached to the destination half-bridge.

It is also an object of the invention to derive a procedure whereby multiple LANs can be fully interconnected by half-bridges using single physical connections to a network containing some generalized switching mechanism.

This object is achieved by suitably multiplexing the frames sent between half-bridges. The LANs need not be Token Rings but, in the preferred embodiment, Token Rings are used so as to provide routing information. The preferred format is compatible with LAPD, which is the Link Access Protocol defined currently for use on ISDN (Integrated Services Digital Network) D channels. Thus, in this preferred format, each half-bridge receives frames destined for a remote Token Ring from the local Token Ring, adjusts (if required) the proper Routing Information (RI) in the MAC (Medium Access Control) frame according to Token Ring Source Routing, envelopes the data in an LAPD frame with the proper Data Link Connection Identifier (DLCI) according to the destination, and sends the frame to the WAN. In the reverse direction, the half-bridge receives LAPD frames from the WAN, extracts the MAC frame from the LAPD frame, adjusts the Routing Information (if required) and puts it on the Token Ring according to Token Ring protocol as described in the IBM Architecture Reference referred to above.

Although the WAN is regarded as another Token Ring LAN by the half-bridges for the purpose of specifying Source Routing Information, it is not a broadcast medium and so does not support switching by selective listening. Consequently, frames that are "All Rings Broadcast Frames" must be transmitted by a half-bridge on each of the logical links established with the remote half-bridges. Of course, frames destined for a specific ring are transmitted on only the one logical link that terminates on the appropriate remote half-bridge. Unlike the full bridges described for physically proximate Token Rings in U.S. Pat. No. 4,621,362 and the IBM Architecture Reference referred to above, the half-bridges of this invention must know the identity of the next bridge in the chain of bridges to the destination, as specified in the Routing Information. This knowledge enables the bridge to choose the appropriate logical link via a preconfigured mapping from bridge numbers to DLCIs. Consequently, the half-bridges must examine more of the Routing Information than do the conventional full bridges.

In the following detailed description of the invention with reference to the accompanying drawings, the expression "bridge" will be used but it should be understood that this refers to the half-bridge used in the inventive technique rather than the full bridge used in the system of U.S. Pat. No. 4,621,362.

BRIEF DESCRIPTION OF THE DRAWINGS

FIG. 14 illustrates the frame formats at different points of the flow chart of FIG. 13.

DESCRIPTION OF THE PREFERRED EMBODIMENT

The invention will firstly be described in broad terms with reference to FIGS. 1 to 7 and will thereafter be described in more detail with reference to FIGS. 8 to 14 taken in conjunction with FIGS. 1 to 7.

Figure 1:
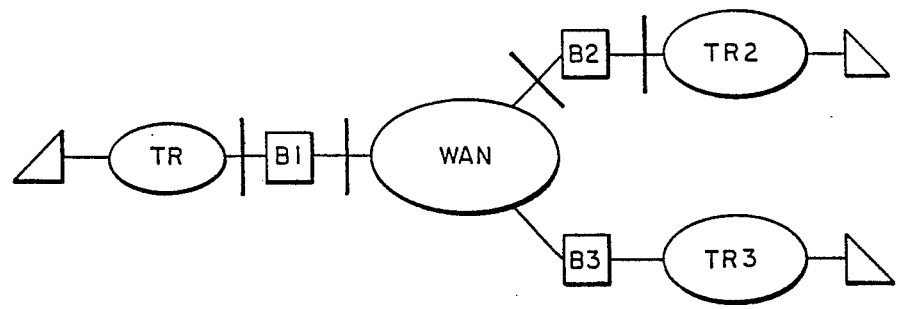
FIG. 1 is a diagram illustrating the interconnection of several token ring networks by means of a Wide Area Network (WAN) according to the invention.

Referring now particularly to FIG. 1, three Token Rings TR1, TR2 and TR3 are shown connected to one another by means of three respective bridges B1, B2 and B3 and a Wide Area Network WAN connected as a central switching hub. Each bridge can be seen to connect the respective Token Ring to the WAN. Although only one work station is shown connected to each Token Ring, in practice there could be two or more work stations connected to each Token Ring. Similarly, more than three Token Rings could be connected to the WAN, with each additional Token Ring having its own bridge. Each bridge is assigned a bridge number that is unique within the context of the Token Ring it is on, each Token Ring is assigned a unique ring number and the WAN is assigned a unique virtual or pseudo ring number.

Figure 2:
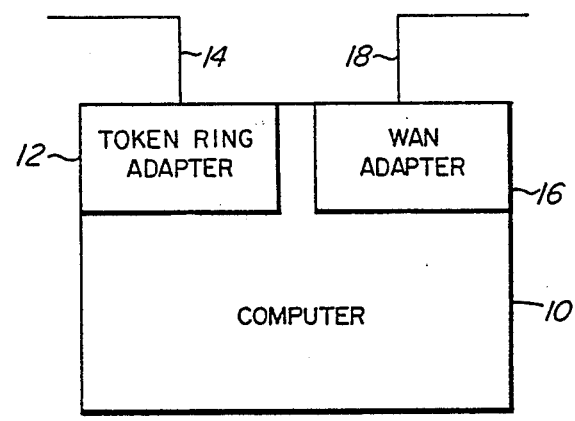
FIG. 2 is a diagram illustrating the hardware used for each of the bridges shown in FIG. 1.

FIG. 2 illustrates the hardware used in an implementation of such a bridge. The main component is a computer 10 such as the Northern Telecom Vienna Advanced office computer (with associated hard disk, screen and keyboard) which is an IBM PC/AT compatible machine.

The computer 10 is connected to its Token Ring via an IBM Token Ring Adapter Card II, indicated by reference numeral 12, and an IBM Token Ring Adapter cable 14 which connects to one of the ring's Multi-Station Access Units (not shown). The IBM Token Ring Adapter 12 is described in the IBM manual entitled "IBM Token Ring Network PC Adapter: Guide to Operation" #67X0394 Second Edition June 1986 which is incorporated herein by reference.

The interface between the computer 10 which runs the bridge software and the communication line 18 to the WAN is provided by a standard synchronous, serial card and its associated driver software. In essence, this card provides via a standard command/response interface, and is basically a means of translating between signals on the PC's bus and signals on the communication line that is plugged into the card. Several such commercially available cards have been used.

The PC-SDMA Synchronous Serial Controller manufactured by ADAX Inc. of California which provides either a RS232 V.24 interface or a RS-422 interface. This card is described in full detail in the manual and software listing supplied by ADAX. The manual is dated June 1986 and is entitled PC-SDMA Synchronous Serial Controller for IBM SNA/SDLC, 3270, and CCITT/HDLC Data Communications. This manual is incorporated herein by reference.

The ISDN PCTA card manufactured by Northern Telecom, which provides an ISDN B-channel with HDLC framing. This card is described in full detail in the manuals supplied by Northern Telecom which manuals are incorporated herein by reference.

Figure 3:
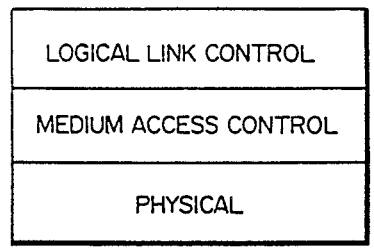
FIG. 3 is a diagram illustrating the bottom, functional layers of a LAN.

Reference will now be made to FIG. 3 in order to place in context the function of the bridge. Every station on a LAN consists of a hierarchy of functions, the bottom layers of which are shown in FIG. 3. At the lowest level is the physical functional component that handles the electrical signalling on the physical medium. At the next level is the functional component that controls the access to the physical medium, cooperating with the corresponding level in all other stations on the LAN to share the medium. This layer formats the data appropriately into "MAC frames" to assist in this function. At the next level is the functional component that, building upon the capabilities of the lower layers, may form logical links between stations. The present invention is particularly concerned with the MAC layer. More specifically, it describes a method of conveying MAC frames between LANs that may be physically distant.

Figure 4:
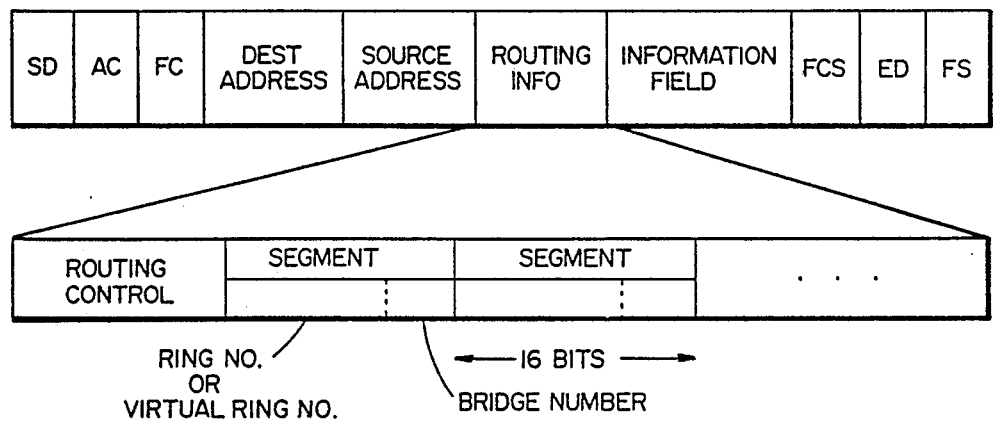
FIG. 4 is a diagram illustrating the medium access control (MAC) frame format used.

Turning now to FIG. 4, this shows the format of a MAC frame. This format is identical to the format described in the above-mentioned IBM Architecture Reference. For the purpose of describing the present invention, only the Source Address field and the Routing Information field need be described in detail herein. The Routing Information field is, as can be seen in FIG. 4, further divided into a 2-octet Routing Control field and as many as m 2-octet Segment Number fields where m is limited by the length of one of the subfields within the Routing Control field. The Segment Number fields contain in sequence the numbers of the rings and bridges through which the frame has to pass in order to transfer information from a work station on a particular TR through the WAN to a work station on a different TR. Thus, for example, with reference to FIG. 1, if information is to be sent from TR1 to TR2, the first Segment (FIG. 4) on the left would have ring number R1 and Bridge number B1, the second Segment would have ring number R0 followed by Bridge number B2 and the third Segment would have ring number R2 with no accompanying Bridge number. It should be noted that R1 and R2 are the ring numbers assigned to TR1 and TR2 respectively, B1 and B2 are the bridge numbers assigned to bridges B1 and B2 respectively, and R0 is the pseudo ring number assigned to the WAN.

It should be noted that the frame format of FIG. 4 includes SD (Start Delimiter), ED (End Delimiter) fields which are distinctive patterns that allow a bridge to determine where a MAC frame begins and ends. The SD and ED fields are stripped by the Token Ring adapter 12 before the frame is passed to the computer 10.

The MAC frame shown in FIG. 4 also includes a FCS (Frame Check Sequence) field for checking bit errors in the frame and an FS (Frame Status) field which indicates whether or not the frame was recognized and copied by any station on the Token Ring. Both of these fields are removed from the MAC frame by the Adapter 2 before the frame is passed to computer 10.

In the reverse direction, the Adapter 12 adds the SD, ED, FCS and FS field to the MAC frame received from computer 10 for placing the frame on a Token Ring.

Figure 6:
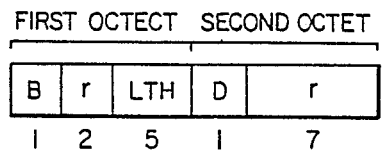
FIG. 6 is a diagram illustrating the format of the Routing Control field of the MAC frame of FIG. 4.

Referring now to FIG. 6, this shows the format of the Routing Control field of FIG. 4. It consists of 16 bits, the first bit, B in the Figure, when set to 1 indicating that the frame has to be sent to all TR's. It does not imply that the frame is destined for all work stations on all TR's. "r" represents two bits reserved for future standardization. They are zeroes and their values will be ignored by receiving bridges. The next five bits marked LTH indicate the total length of the Routing Information field including the Routing Control field in octets. As the Routing Information field is of variable length while all the other fields in the frame header are of fixed length, the length indicator is needed so that the remainder of the frame can be parsed. For frames broadcast to all TR's, the LTH field indicates to a bridge where to insert the ring and bridge numbers. Thus, for a broadcast frame, this field is initialized to 2 by the transmitting station. It is incremented by 4 by the first bridge that forwards the frame because the first bridge places both the first segment number and the second segment number in the RI field. Successive bridges insert only one segment number and therefore increment by 2.

The length of the RI field also furnishes a basis for comparison with a bridge's hop-counts, for it reflects the number of segments, that a frame has been on so far. For a non-broadcast frame already carrying routing information, the field indicates the length of the RI field, but remains unchanged as the frame traverses the network.

Direction (D): This bit indicates to a bridge whether a frame is travelling from the originating station to the target or the other way around. Its use allows the list of segments in the RI field to appear in the same order for frames travelling in both directions along the route.

Figure 5:
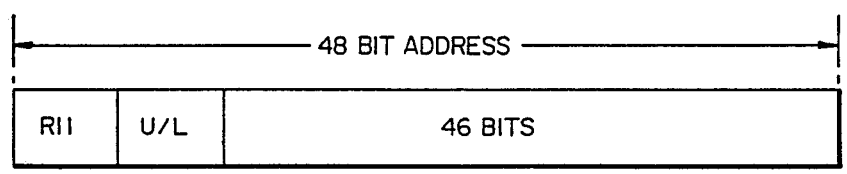
FIG. 5 is a diagram illustrating how the Source Address field of the MAC frame of FIG. 4 is used to indicate the presence of a Route Information field.

Referring now to FIG. 5, this shows the use of the Routing Information Indicator the Source address field address, as indicating the presence of a RI field. When this RI indicator (RII) is set to 1 by the transmitter of a frame, it indicates that an RI field is included in the frame.

Figure 7:
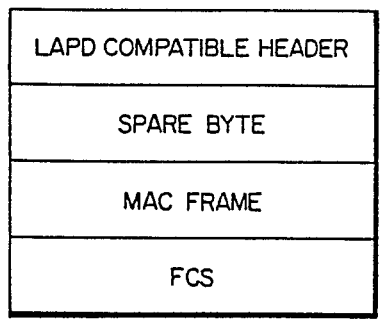
FIG. 7 is a diagram illustrating how the MAC frame is encapsulated in a LAPD-compatible format by a bridge for transmission by the WAN of FIG. 1.

The MAC frame format described above can only be transmitted by the WAN if the MAC frame is encapsulated in a frame suitable for transmission into the WAN. The frame format chosen is compatible with LAPD (Link Access Protocol D channel) format; specifically, Multiframe Mode I-frames and RR-frames. It is noted that only the LAPD frame format is followed and that no LAPD elements of procedure are retained. The frame format is shown in FIG. 7. It can be seen that the MAC frame of FIG. 4 (less the SD, ED, FCS and FS fields as indicated above) is encapsulated between the header and the Frame Check Sequence (FCS) field of the LAPD-compatible frame, with a spare byte between the header and the MAC frame. The spare byte can be used for bridge to bridge communication, i.e., for network management purposes.

As will be described in greater detail below the LAPD-compatible frame format used here includes in the header a Data Link Connection Identifier (DLCI) and this is used in the present invention. Each bridge routes frames via the appropriate logical link obtained by mapping the remote bridge number to a DLCI.

Reverting to FIG. 2, the Bridge processing thus far described is summarized as follows:

Transmission from a Token Ring on to the WAN (1) The SD, ED, FCS and FS fields of the MAC frame of FIG. 4 are removed in Adapter 12 and the bare MAC frame passed to computer 10.

(2) Computer 10 modifies the bare MAC frame and adds the LAPD header containing the DLCI,and the spare byte.

(3) Adapter 16 adds the FCS field which completes the LAPD encapsulation as shown in FIG. 7.

Reception from the WAN and Transmission to a Token Ring.

(4) Adapter 16 receives the LAPD frame strips/checks the FCS field and forwards the frame to computer 10.

(5) Computer 10 strips the LAPD header and spare byte and forwards the modified MAC frame to Adapter 12.

(6) Adapter 12 adds the SD, ED, FCS and FS fields before the frame is passed to the Token Ring.

Steps (2) and (5) above refer generally to actions by the computer in processing the frames. This processing is detailed as follows.

Transmission from a Token Ring on to a WAN

Frames to all Rings ("All-Rings-Broadcast-frames")
 Establish need to forward—i.e., make sure that the frame has not already visited the ring that this bridge will forward it to.
 Append/ Modify the RI field.
 Broadcast to all bridges known (i.e., send out a copy on each of the logical links that exist).
Frames to a Specific Ring
 Check the routing information to determine if this frame can be forwarded by this bridge.
 Determine neighboring bridge to forward to.
 Map remote bridge number to DLCI.

Queue the frame for transmission to the WAN.

Reception from the WAN and transmission on to a Token Ring

Strip DLCI.

The forwarding decisions are the same as those for frames received from the Token Ring Network.

The frames are then placed into the queue for transmission on the Token Ring.

Returning to FIG. 2 which shows the bridge hardware, the computer 10 runs the bridge program. The Token Ring Adapter 12 provides for the MAC layer protocol handling and all the details associated with being a work station on the Token Ring. The Adapter 12 handles the procedures for Token claiming, error monitoring etc. It provides a simplified interface to the applications on computer 10, whereby information is exchanged by means of commands and responses.

Adapter 16 enables the bridge to access the WAN via the access loop 18 and provides for the transmission of the LAPD-compatible frames without the underlying elements of procedure. In effect, the Adapter 16 provides the capability of transmitting a packet supplied by the computer 10 using LAPD-compatible framing.

The bridge is implemented as a user program running on computer 10. More specifically, it uses a PC Disk Operating System DOS3.20, which is fully described in IBM documents such as "IBM DOS Technical Reference" Document Number 6138536 which is incorporated herein by reference.

This concludes the overview of the invention. The frame format and the processing of the frames will now be described in greater detail with reference to FIGS. 8 to 14.

Figure 8:
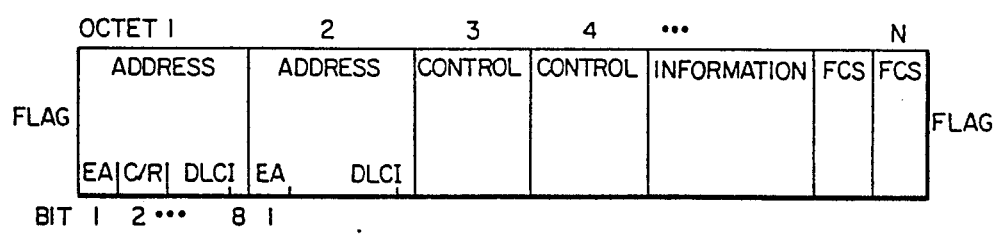
FIG. 8 shows the various fields of the I-frame format used.

The frame formats used are compatible with LAPD as currently defined for conveying information on the D-Channel of Integrated Services Digital Networks (ISDN) and described in detail in the document entitled: "Report on the Meeting held in Geneva from 3 to 14 November 1986 [Part C.6.1—Recommendations Q.920 and Q.921]" published by the International Telegraph and Telephone Consultative Committee and incorporated herein by reference. Specifically, two formats are used: I-frames for encapsulating the Token-Ring MAC frames, and RR-frames issued periodically if there is no other data to send, in order to maintain contact with all known remote bridges. The format of I-frames is as shown in FIG. 8.

The address Field consists of two octets containing a Data Link Connection Identifier (DLCI), a Command-/Response (C/R) bit, and two Address Extension (EA) bits.

The DLCI consists of 13 bits, 6 bits in the first octet of the Address Field and 7 bits in the second octet. Bit 8 of the first octet is the most significant bit; bit 2 of the second octet is the least significant. Each half-bridge, when it is configured, has a table assigning a unique (to it) DLCI to each of the remote bridges with which it can communicate.

Descriptions of the C/R and EA bits, which are not used by the bridge, can be found in the above-mentioned document. The first octet's EA bit is always set to 0; the second octet's EA bit is always set to 1. The C/R bit is always set to 0.

The Control Field consists of two octets. These are not described further in this application since their usage is not pertinent to this application and is, moreover, described fully in the document cited above.

The Information field consists of the data the bridge chooses to send. This consists of a spare byte for possible use in the future, followed by a Token-Ring MAC frame.

The Frame Check Sequence (FCS) is a 16-bit sequence used to detect bit errors. It is calculated in the standard fashion by Adapter 16, and is described fully in the document cited above. All frames are separated by means of the distinctive bit patterns termed "flags", as described fully in the document cited above.

Figure 9:
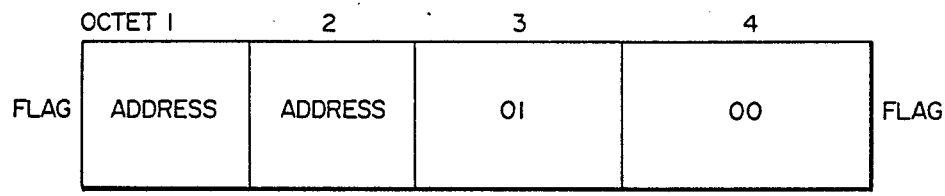
FIG. 9 is a diagram illustrating the format of the RR-frame format used.
Figure 10:
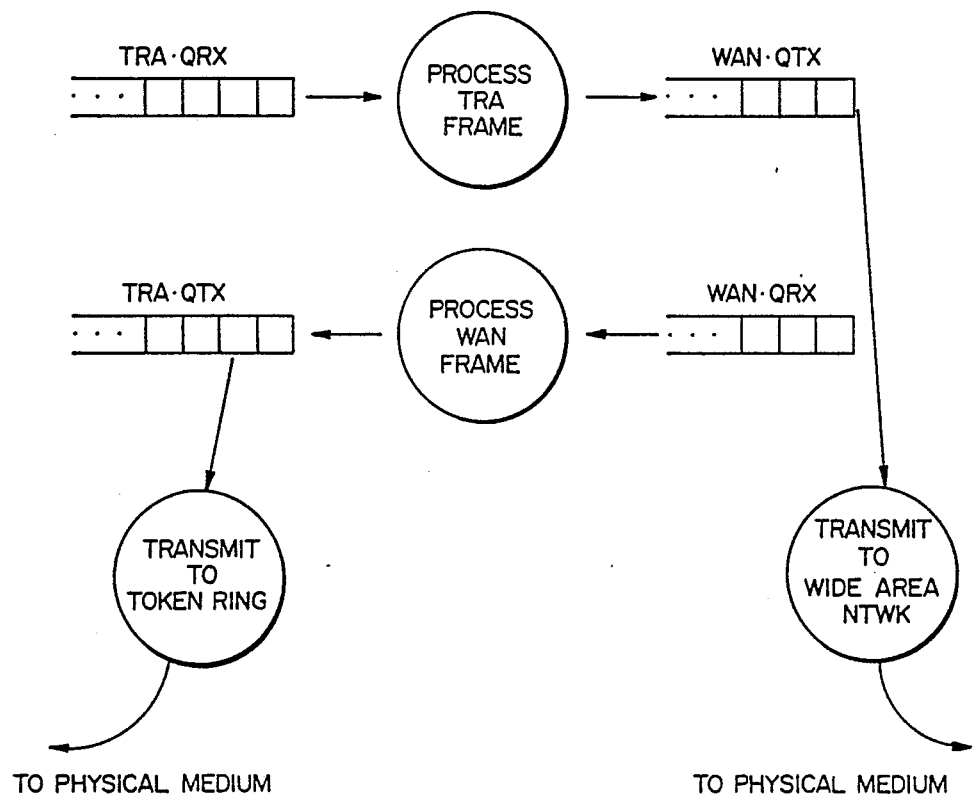
FIG. 10 is a diagram illustrating the bridge functions.
Figure 11A:
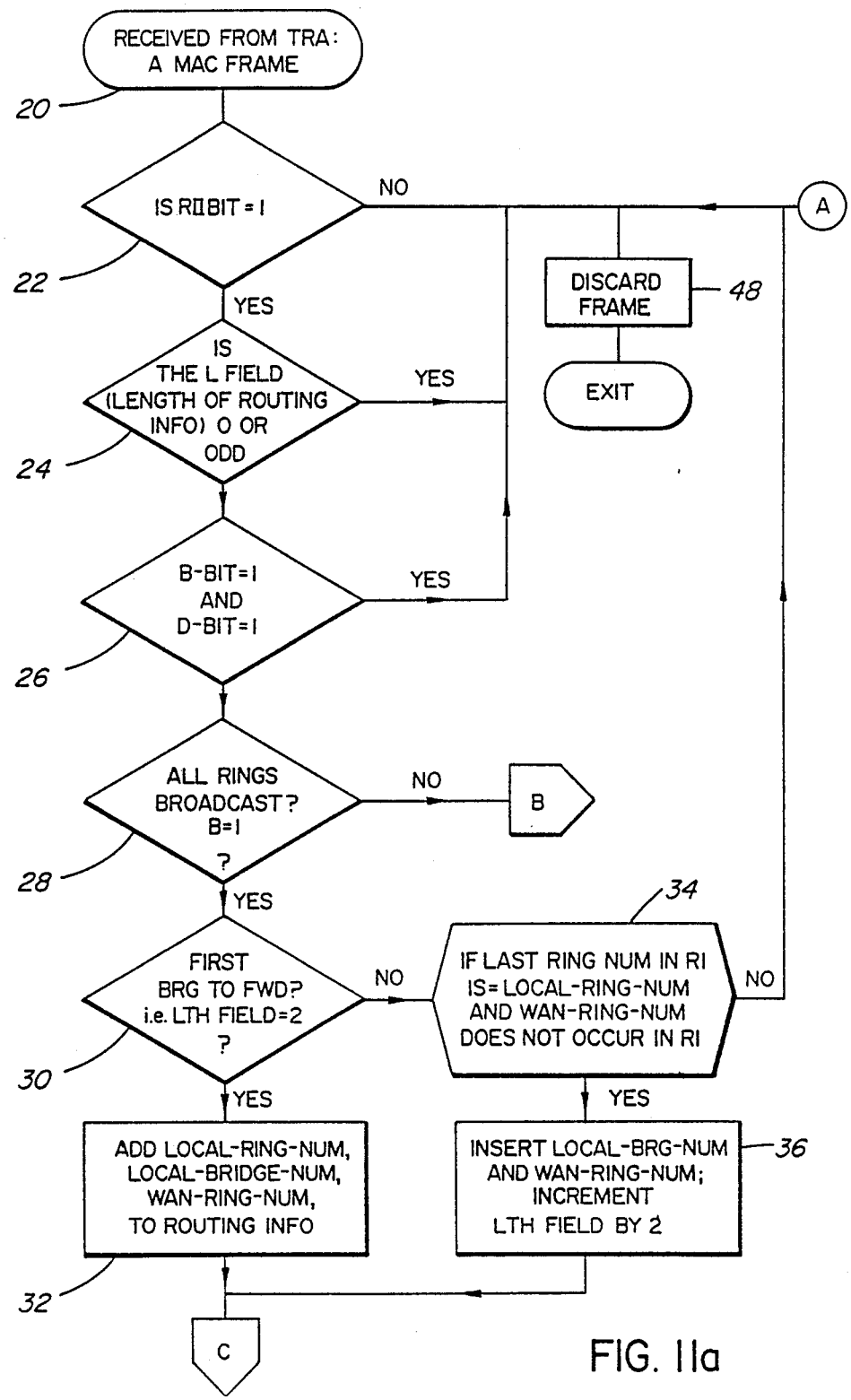
FIGS. 11a–11c shows a flow chart illustrating the steps involved in processing a MAC frame from a Token Ring for transmission by the WAN.
Figure 11B:
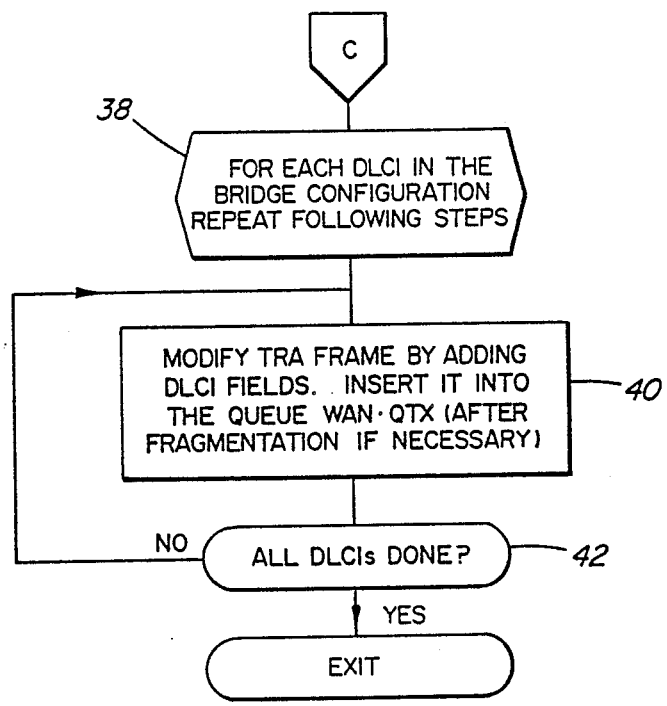
Figure 11B:
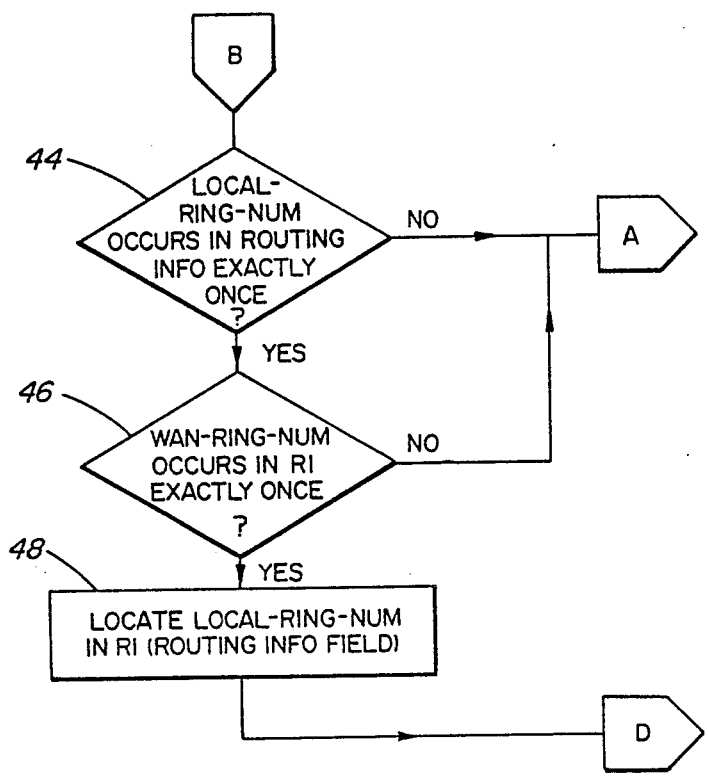
Figure 11C:
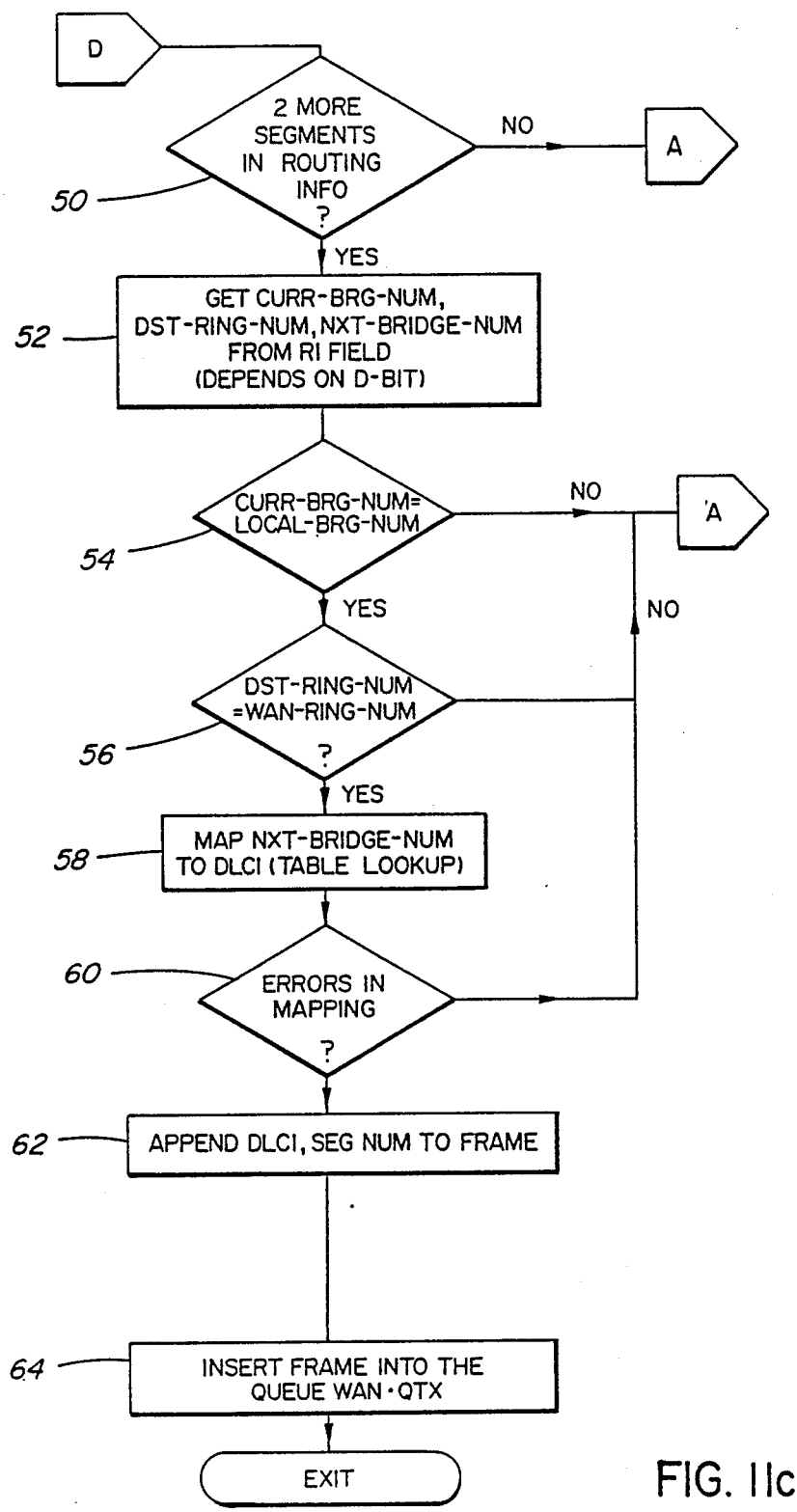

The format of RR-frames is as shown in FIG. 9.

The Address Field is as described above for I-frames.

The bridge does not implement the elements of procedure normally associated with the corresponding LAPD frame formats. That is, it does not take any action to recover frames lost or damaged in transit through the WAN. Instead, it relies on the WAN to provide a data transport service that is non-duplicating and order preserving, and it relies on the Token-Ring end-stations to take any necessary recovery actions.

With reference now to FIGS. 10–14, the functions of the bridge will be described in detail. As described briefly above, each bridge serves to process MAC frames received from a TRA (Token Ring Adapter) and transmit them as MAC frames on to the TR as illustrated in the Bottom part of FIG. 10. The software for carrying out this processing and which is stored in computer 10 is illustrated in the form of flow charts, FIGS. 11 and 13.

Figure 12A:
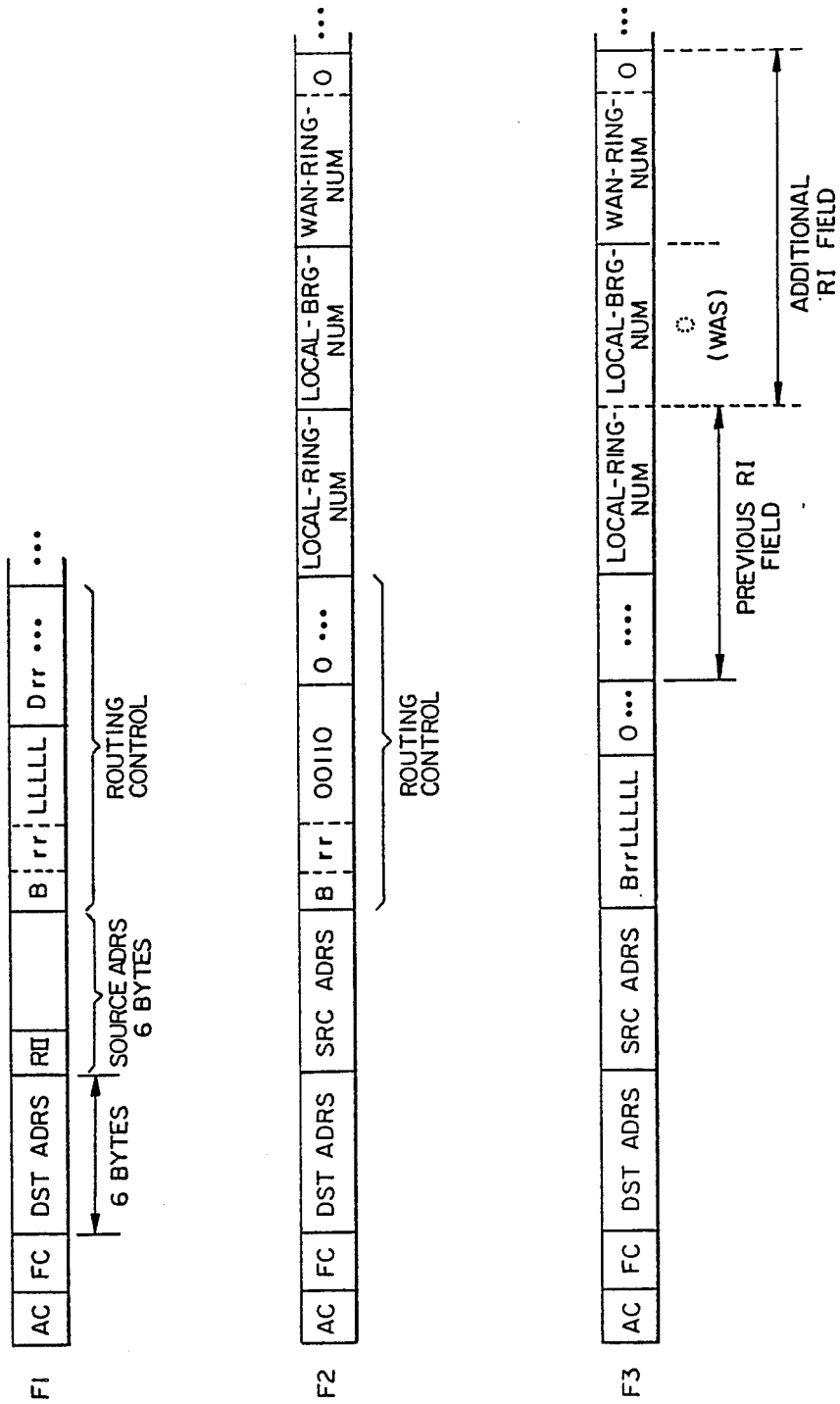
FIGS. 12a and 12b illustrates the frame formats at different points of the flow chart of FIG. 11.
Figure 12B:
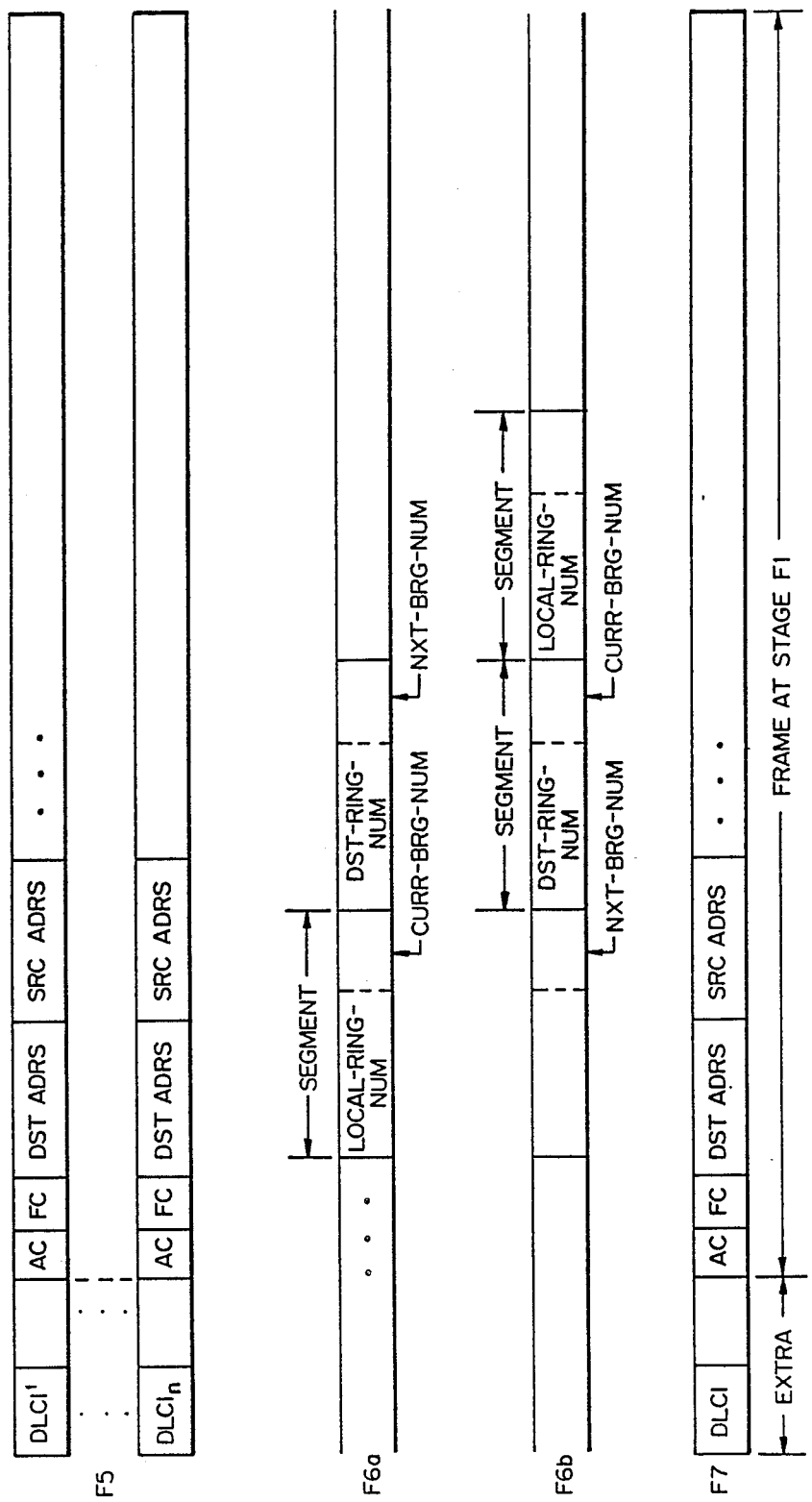

With reference to FIG. 11 which is a flow chart for the processing of the MAC frame received from a TRA and FIG. 12 which illustrates frame formats at different points of FIG. 11, block 20 represents the receiving of the MAC frame. At block 22 the presence or absence of Routing Information is determined by the RII bit in the Source Address of the MAC (see FIG. 5). Blocks 24, 26 and 28 in turn examine the Length, Direction and Broadcast bits of the routing control field (see FIG. 6). If Routing Information is present, the length field is not 0 or odd, the D bit is 0 and B is 1, the program moves to block 30. If the length field=2 which indicates the first bridge the program moves to block 32 which adds the WAN Ring Number to the Routing Information field. Compare frame format F2 (FIG. 12) which represents the signal after block 32 with F1 which represents the signal entering block 20.

If block 30 decides that the Length field is not equal to 2, i.e., greater than 2, the program steps to block 34 which decides whether the last Ring number in the Routing Information field is equal to the local Ring Number and the WAN Ring Number does not occur. If the answer is yes, the program steps to block 36 which inserts the local bridge number and the WAN Ring Number and increments the L-field by 2, thereby giving the frame format F3 (FIG. 12).

The frame format F2 or F3 then passes to block 38 and 40 which modify the frame by adding for each DLCI in the bridge configuration the DLCI and field. This is shown as frame format F5 in FIG. 12. This frame is then inserted into the transmit queue for frames destined for the WAN, referred to as Queue WAN Qtx. Block 42 simply checks that all DLCI's have been added.

Going back to block 28 if B≠1, meaning that the frame has not to be broadcast to all rings, the program steps through B to block 44 which determines if the local Ring Number occurs in the Routing Information field exactly once and, if so, moves on to block 46. If not, the program steps through A to block 48 which discards the frame. (The "No" output of block 27 and the "Yes" outputs of blocks 24 and 26 also lead to frame discard block 48.) Reverting to block 46, this decides whether the WAN Ring Number in the Routing Information field occurs exactly once and, if so, the program steps to block 48 which locates the local Ring Number in the Routing Information field. The program then steps to block 50 which determines if there are 2 more segments in the information field and, if so, the program moves to block 52 where the current bridge Number, the distant Ring Number and the next bridge Number are obtained from the Routing Information field. Frame formats F6a for a direction bit=0 and F6b for a direction bit=1 apply.

Then at block 54 the current bridge Number obtained is compared with the local bridge Number and if they are the same, the program steps to block 56 where the distant Ring Number obtained is compared to the WAN Ring Number and, if they are the same, the program steps to block 58 which maps the next bridge Number obtained from the RI field (block 52) to the DLCI in a look up table. Mapping errors are checked in block 60 and in block 62 the DLCI is appended to the frame as shown in F7 (FIG. 12) and finally the frame is inserted into the Queue WAN Qtx in block 64.

Negative decisions at any of blocks 44, 46, 50, 54, 56 or 60 result in the program stepping to block 48 which discards the frame.

Figure 13A:
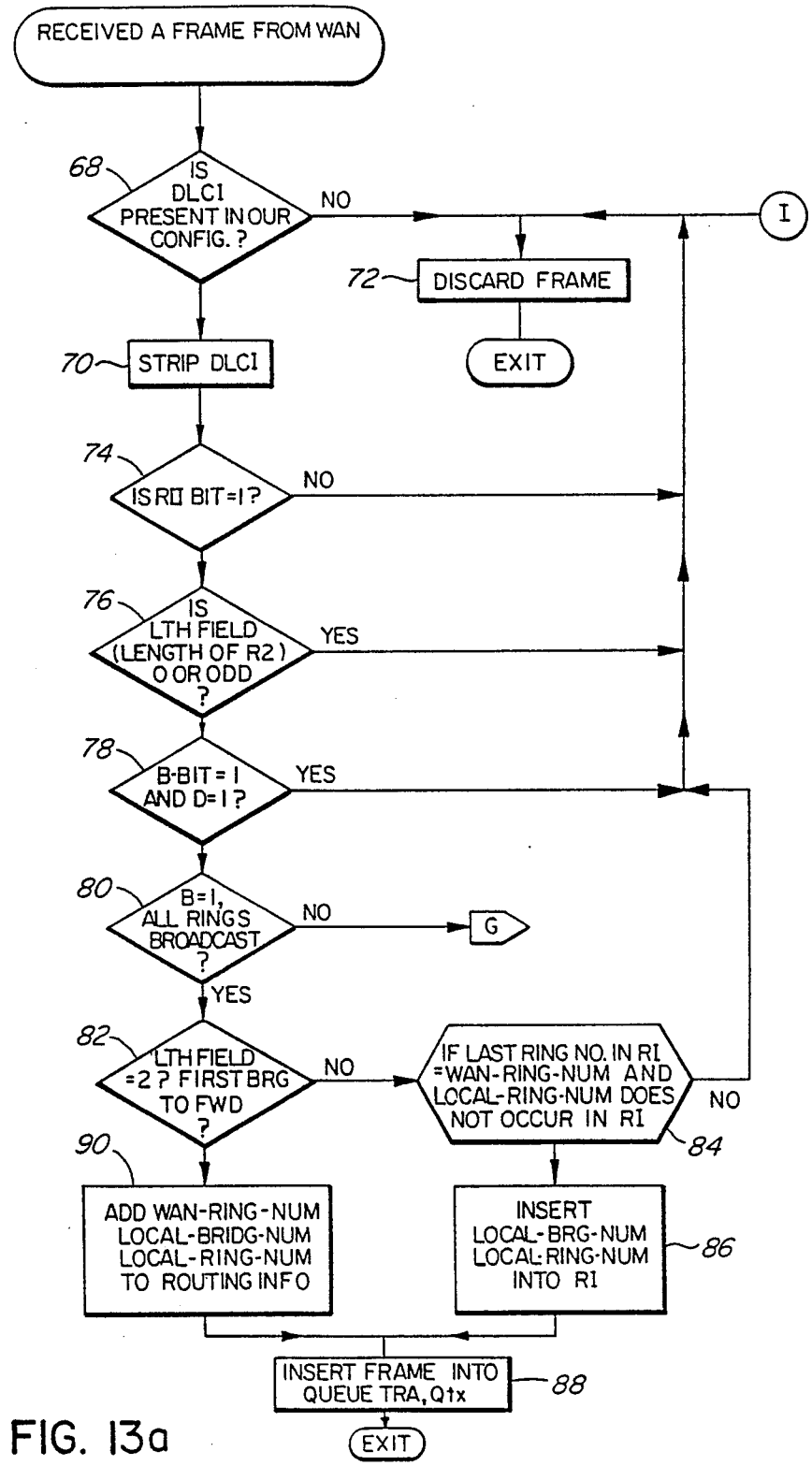
FIGS. 13a and 13b shows a flow chart illustrating the steps involved in processing by a bridge a frame received from the WAN for distribution to a Token Ring.
Figure 13B:
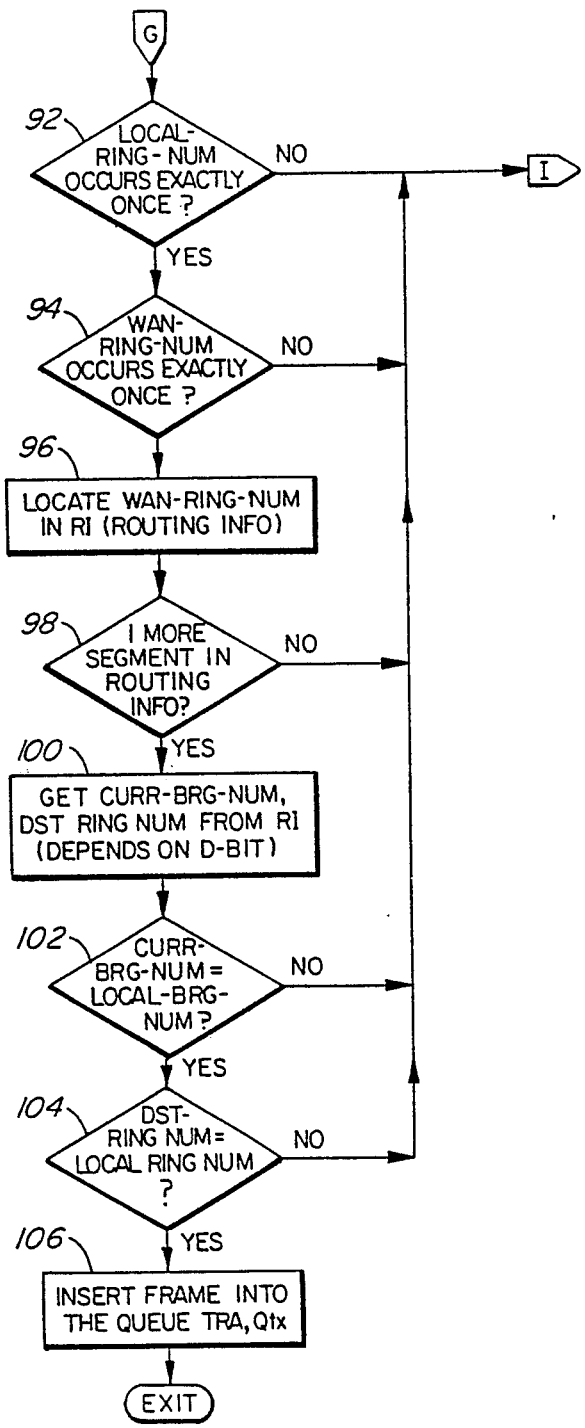

Turning to FIGS. 13 and 14, when a frame F7 as shown in FIG. 12 is received from the WAN it is processed by the software in the bridge, the first step being a decision in block 68 as to whether the DLCI present is the one unique to that bridge. If it is, the program steps to block 70 where the DLCI is stripped as represented at F8 in FIG. 14. If the unique DLCI is not recognized, the frame is discarded at block 72.

Blocks 74, 76, 78, 80 and 82 correspond to blocks 22, 24, 26, 28 and 30 of FIG. 11. At block 82, in our example where the frame has already been forwarded by a bridge across the WAN, the LTH-Field does not equal 2 and the program steps to block 84 which decides whether the last Ring Number in the Routing Information field equals the WAN Ring Number and the Local Ring Number does not occur. If the answer is yes, the program steps to block 86 which inserts the Local Bridge and Ring Numbers into the Routing Information field as shown at F10 in FIG. 14.

The program then steps to block 88 which inserts frame F10 into the transmit queue for frames destined for the local Token Ring, referred to as Queue TRA Qtx.

As indicated previously the Adapter Card 12 adds the SD, ED, FCS and FS fields before the frame is passed to the Token Ring.

Block 90 relates to the general case of where a WAN Ring Number is added to the Routing Information field if the bridge is the first to forward and would not, of course, apply in the case of receiving frames from the WAN.

Reverting to block 80, if all rings broadcast is not true, the program steps through G to block 92 which determines if the local Ring Number occurs in the Routing Information field exactly once and, if so, moves on to block 94. If not, the program steps through I to block 72 which discards the frame.

Block 94 decides whether the WAN Ring Number in the RI field occurs exactly once and, if so, the program steps to block 96 which locates the WAN Ring Number in the RI field. The program then steps to block 98 which determines if there is 1 more segment in the RI field and, if so, the program moves to block 100 where the current bridge Number and the distant Ring Number are obtained from the RI field. Frame formats F11a for a direction bit=0 and F11b for a direction bit=1 apply.

Then at block 102 the current bridge Number obtained is compared with the local bridge Number and, if they are the same, the program steps to block 104 where the destination Ring Number obtained is compared to the local Ring Number and, if they are the same, the program steps to block 106 which inserts frame F11a or F11b into the transmit queue.

It should be understood that the present invention may be embodied in other specific forms without departing from the spirit of the invention and that the scope of the invention is defined by the appended claims.

What we claim as our invention is:

1. A communication system for sending data link frames between mutually remotely located token rings via a communication network, comprising respective bridge means connecting each token ring to the network, each bridge means comprising means for inserting source routing information in the frames to specify the order in which the frames are to be routed through the token rings, the bridge means and the network, the source routing information including bridge numbers unique to the respective bridge means, ring numbers unique to the respective token rings and a virtual ring number identifying the network.

2. A communication system as claimed in claim 1 in which there are only two token rings and the network is a point-to-point link.

3. A communication system as claimed in claim 1 capable of communicating among at least three token rings interconnected by the communication network which contains a switching means, in which the bridge means includes means for multiplexing the frames for transmission and switching by the network.

4. A communication system as claimed in claim 3 in which the means for multiplexing encapsulates the frames in a LAPD-compatible frame having a header containing an identifier of a bridge means for which the LAPD-compatible frame is destined.

5. A communication system as claimed in claim 4 in which the routing information is contained in a routing information field in each frame, the routing information field being divided into a routing control field and segment number fields, each segment number field having a space for a ring number or a virtual ring number as the case may be and a space for a bridge number.

6. A communication system as claimed in claim 4 in which the header includes a two octet address field containing the identifier for the bridge.

7. A communication system as claimed in claim 1, in which the routing information is contained in a routing information field in each frame, the routing information field being divided into a routing control field and segment number fields, each segment number field having a space for a ring number or a virtual ring number as the case may be and a space for a bridge number.

* * * * *

UNITED STATES PATENT AND TRADEMARK OFFICE
CERTIFICATE OF CORRECTION

PATENT NO. : 4,901,312
DATED : 2/13/90
INVENTOR(S) : Man H. Hui et al

It is certified that error appears in the above-identified patent and that said Letters Patent is hereby corrected as shown below:

On the title page, insert item [73] Assignee: as follows:

--Assignee: Bell Canada--.

Signed and Sealed this

Seventeenth Day of November, 1992

*Attest:*

DOUGLAS B. COMER

*Attesting Officer*   Acting Commissioner of Patents and Trademarks